(12) United States Patent
Steinberg et al.

(10) Patent No.: US 6,847,764 B2
(45) Date of Patent: Jan. 25, 2005

(54) OPTICAL INTERCONNECT HAVING ALIGNMENT DEPRESSION

(75) Inventors: Dan A. Steinberg, Blacksburg, VA (US); David W. Sherrer, Blacksburg, VA (US)

(73) Assignee: Shipley Company, L.L.C., Marlborough, MA (US)

( * ) Notice: Subject to any disclaimer, the term of this patent is extended or adjusted under 35 U.S.C. 154(b) by 349 days.

(21) Appl. No.: 09/835,863

(22) Filed: Apr. 16, 2001

(65) Prior Publication Data

US 2001/0041029 A1 Nov. 15, 2001

Related U.S. Application Data

(60) Provisional application No. 60/197,130, filed on Apr. 14, 2000.

(51) Int. Cl.[7] ............................... G02B 6/26; G02B 6/42
(52) U.S. Cl. .......................................... 385/50; 385/52
(58) Field of Search .............................. 385/50, 14, 49, 385/55, 52, 88, 129

(56) References Cited

U.S. PATENT DOCUMENTS

| | | |
|---|---|---|
| 4,818,058 A | 4/1989 | Bonanni |
| 4,836,638 A | 6/1989 | Finzel ..................... 350/96.21 |
| 5,123,073 A | 6/1992 | Pimpinella |
| 5,179,609 A | 1/1993 | Blonder et al. |
| 5,297,228 A | 3/1994 | Yanagawa et al. .......... 385/129 |
| 5,325,451 A | 6/1994 | Hartman et al. .............. 385/49 |
| 5,342,478 A | 8/1994 | Welbourn .................... 156/643 |
| 5,345,530 A | 9/1994 | Lebby et al. ................. 385/88 |
| 5,361,382 A | 11/1994 | Nakamura et al. ............ 385/49 |
| 5,377,900 A | 6/1995 | Bergmann |
| 5,596,662 A | 1/1997 | Boscher ....................... 385/55 |
| 5,613,024 A | 3/1997 | Shahid ........................ 385/52 |
| 5,689,599 A | 11/1997 | Shahid |
| 5,703,973 A | 12/1997 | Mettler et al. ................ 385/14 |
| 5,706,378 A | 1/1998 | Suzuki et al. ................. 385/49 |
| 6,012,852 A | 1/2000 | Kadar-Kallen et al. |
| 6,085,007 A | 7/2000 | Jiang et al. |
| 2003/0007740 A1 | 1/2003 | Sherrer |
| 2003/0138210 A1 | 7/2003 | Steinberg et al. |

*Primary Examiner*—Chandrika Prasad
(74) *Attorney, Agent, or Firm*—Jonathan D. Baskin (57) ABSTRACT

An optical interconnect includes a waveguide holder having a first side and a second side. The first side has a first depression and the second side has a second depression. The waveguide holder has an opening in which a plurality of waveguides are disposed.

20 Claims, 5 Drawing Sheets

OPTICAL INTERCONNECT HAVING ALIGNMENT DEPRESSION

CROSS-REFERENCE TO RELATED APPLICATIONS

The present invention claims priority from U.S. Provisional Patent Application Ser. No. 60/197,130 filed Apr. 14, 2000, entitled "Connector Structure For Integrated Optic Devices." The disclosure of the above captioned provisional patent application is specifically incorporated by reference herein.

FIELD OF THE INVENTION

The present invention relates generally to optical connectors, and particularly to an optical integrated circuit (OIC) that is connected to another OIC or to an optical fiber array.

BACKGROUND OF THE INVENTION

Optical integrated circuits include devices such as 1×N splitters, switches, wavelength division multiplexers and other like devices which may be deposited on a planar substrate, often referred to as a chip. The devices in the optical integrated circuit are often connected by waveguides. These waveguides are usefully planar waveguides that are fabricated on the surface of the chip. These planar waveguides are fabricated by a variety of techniques using various materials well known to one having ordinary skill in the art. The OIC is achieving more widespread use because it enables a more integrated and reliable structure for optical components. Moreover, the OIC is readily manufacturable with known manufacturing techniques.

The OIC is often connected to an optical fiber array for either short-haul or long-haul transmission via existing infrastructure. As such, it is useful to have an accurate interconnection between the OIC and the optical fiber array.

The accuracy of the interconnection depends greatly upon the alignment between the OIC and the optical fiber array at the interconnection point. As such, accurate optical connectors are used. Moreover, industry standards have resulted in the use of a variety of connectors.

There are basically two alignment techniques used to align the optical waveguides of the OIC to the optical fibers of a fiber array. One alignment technique is via active alignment, where the optical fibers are aligned to the planar waveguides while monitoring the optical transmission of the connection visually or by other active monitoring techniques. While active alignment enables a great deal of accuracy in the optical interconnection, it is a time consuming and labor intensive method. As such, it is not well suited for large-scale manufacturing.

Another alignment technique used to achieve alignment between waveguides of an OIC and an optical fiber array is passive alignment. Passive alignment comprises positioning the optical waveguides of the OIC relative to the optical fiber array without the labor intensive monitoring of the optical transmission of the connection. Passive alignment techniques have gained a great deal of popularity within the optical community because they afford a large-scale and low-cost technique for achieving the desired interconnection. Unfortunately, even though passive alignment techniques have the advantage of low-cost and large-scale manufacturing, the accuracy of the alignment may be less than acceptable.

Accordingly, what is needed is an interconnection structure for connecting waveguides in a passive manner which overcomes the drawbacks of the prior art described above.

SUMMARY OF THE INVENTION

According to an illustrative embodiment of the present invention, an optical interconnect includes a waveguide holder having a first side and a second side. The first side has a first depression and the second side has a second depression. The waveguide holding member further includes an opening in which a plurality of waveguides are disposed.

BRIEF DESCRIPTION OF THE DRAWINGS

The invention is best understood from the following detailed description when read with the accompanying drawing figures. It is emphasized that the various features are not necessarily drawn to scale. In fact, the dimensions may be arbitrarily increased or decreased for clarity of discussion.

DETAILED DESCRIPTION

In the following detailed description, for purposes of explanation and not limitation, exemplary embodiments disclosing specific details are set forth in order to provide a thorough understanding of the present invention. However, it will be apparent to one having ordinary skill in the art having had the benefit of the present disclosure, that the present invention may be practiced in other embodiments that depart from the specific details disclosed herein. Moreover, descriptions of well-known devices, methods and materials may be omitted so as to not obscure the description of the present invention.

Briefly, the present invention relates to an optical interconnect having a waveguide holder with a first side and a second side. The first side of the waveguide holder has a first depression and the second side of the waveguide holder has a second depression. A first guide pin is disposed in the first depression and a second guide pin is disposed in the second depression. The waveguide holder may be a single piece, or may comprise multiple pieces. The waveguide holder may be formed from materials conducive for use in optical applications.

The optical interconnection of the present invention enables accurate coupling of optical waveguides to other optical waveguides. To this end, the optical interconnect of the present invention enables accurate coupling of optical waveguides such as those typically used in OIC's to other optical waveguides such as those disposed in another OIC or in an optical fiber array. The optical interconnect of the present invention may be incorporated into standard optical connectors 114, such as the MT, mini-MT, MAC or other optical connectors well known to one having ordinary skill in the art.

Figure 1:
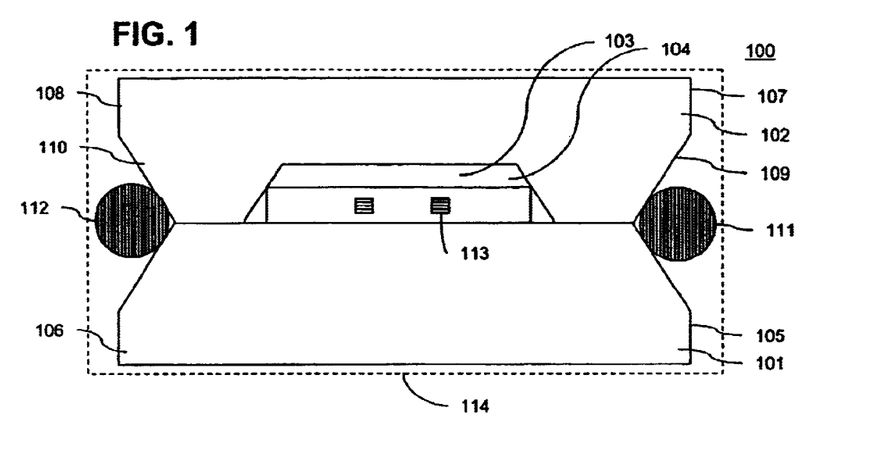
FIG. 1 is a front view of an optical interconnect according to an exemplary embodiment of the present invention.

FIG. 1 shows an optical interconnect 100 according to an illustrative embodiment of the present invention. The optical interconnect 100 further includes a substrate 101 and a lid 102. Collectively, the substrate 101 and lid 102 may comprise an optical waveguide holder. An opening 103 in the lid 102 illustratively includes an optical waveguide structure 104, which is disposed over the substrate. The optical waveguide 104 illustratively includes planar waveguides 113, which may be part of an integrated optic chip. The substrate 101 has a first side 105 and a second side 106. Similarly, the lid 102 has a first side 107 and a second side 108. When the lid 102 is disposed over the substrate 101, a first depression 109 and a second depression 110 are defined. A first guide pin 111 is disposed in the first depression and a second guide pin 112 is disposed in the second depression 110. Illustratively, the lid 102 is adhered to the substrate 101. This adhesion may be carried out by well-known techniques including by use of a suitable adhesive, such as epoxy or glass or by other techniques (e.g. wafer-wafer bonding) that are well known to one having ordinary skill in the art.

The first and second guide pins 111 and 112, respectively, may be used to accurately couple the waveguides 113 to other optical waveguides such as optical fibers in an optical fiber array other optical waveguides such as waveguides of another integrated optic chip. To achieve efficient optical coupling between waveguides 113 and other waveguides such as optical fibers, the optical waveguides 113 must be accurately positioned relative to the first and second guide pins 111 and 112, respectively. The present invention enables this accurate placement of the optical waveguides 113 relative to the guide pins 111 and 112 through passive alignment. To this end, first and second depressions 109 and 110, respectively, are accurately located and oriented relative to the waveguides 113. The accuracy of the passive alignment of the guide pins 111 and 112 relative to the optical waveguides 113 fosters accurate passive alignment of the optical interconnect 100 to other optical waveguides, such as an optical fiber array.

Illustratively, the substrate 101 and the lid 102 are monocrystalline material, such as monocrystalline silicon. The first and second depressions 109 and 110, respectively, as well as opening 103, may be fabricated anisotropic etching of the monocrystalline material. This anisotropic etching is typically a wet-etching which reveals the principle planes of the monocrystalline material. Anisotropic etching techniques are well known to one having ordinary skill in the art. Further details of such an illustrative etching technique may be found in U.S. Pat. No. 4,210,923 to North, et al., the disclosure of which is specifically incorporated by reference herein. Through the illustrative anisotropic etching, the dimensions and orientations of the etch may be precisely determined. This, of course, fosters the accuracy of the location and orientation of the first and second depressions 109 and 110, and therefore, of the locations of the guide pins 111 and 112, respectively.

Figure 2:
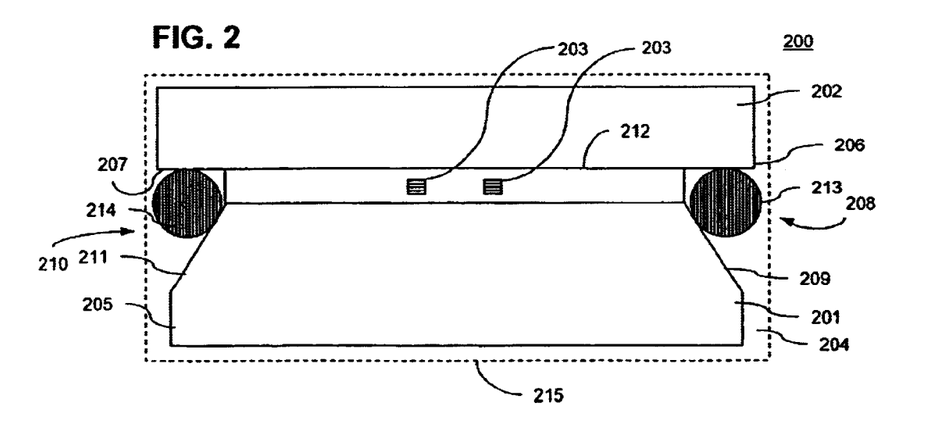
FIG. 2 is a front view of an optical interconnect according to an exemplary embodiment of the present invention.

FIG. 2 shows an optical interconnect 200 according to another illustrative embodiment of the present invention. A substrate 201 has a lid 202 disposed thereover. Again, collectively, the substrate 201 and lid 202 may be referred to as a waveguide holder. An optical waveguide structure 212 includes optical waveguides 203. The substrate 201 has a first side 204 and a second side 205. The top silicon chip 202 has overhangs 206 and 207. A first depression 208 is formed with the edge 209 of the first side of the substrate 204 and the overhang 206 of the lid 202. A second depression 210 is created with edge 211 of the second side 205 of substrate 204 and the overhang 207 of the lid 202.

The optical interconnect 200 is similar to the optical interconnect 100 shown in the illustrative embodiment of FIG. 1. However, as can be seen in FIG. 2, the lid 202 is not etched, and accordingly there is not an opening for the optical waveguides 203. As such, the lid 202 may rest on the waveguide structure 212. Moreover, first and second depressions 208 and 210 are not substantially v-shaped as are those in the illustrative embodiment of FIG. 1. Nonetheless, accurate location and orientation of edges 209 and 211 through anisotropic etching enables the accurate location and orientation of first and second depressions 208 and 210. Accordingly, first and second depressions 208 and 210 enable accurate positioning of first and second guide pins 213 and 214, respectively.

Thus, the accuracy of location of guide pins 213 and 214 fosters accurate passive alignment of the optical interconnect 200 to other waveguides, such as an optical fiber array or other optical waveguides. Again, the structure shown in the illustrative embodiment in FIG. 2 may be incorporated for use into a standard optical connector 215 such as MT, mini MT or MAC connectors.

A particular advantage of the illustrative embodiment of FIG. 2 is that the lid 202 does not need to be accurately located on the substrate 201. The lid can be a flat piece of material (without greeoves or sloped edges). The lid 202 can be made of materials such as silicon, glass, ceramic or quartz. The lid 202 can be adhered to the substrate with glue (e.g. epoxy), glass or other materials or techniques.

Figure 3:
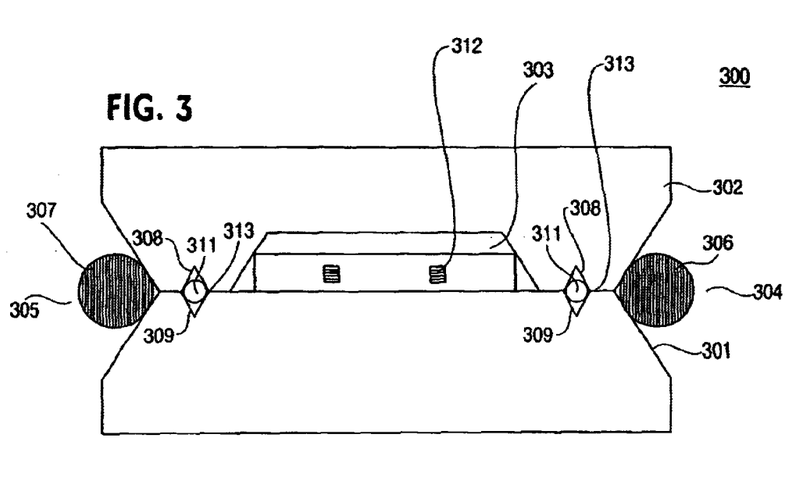
FIG. 3 is a front view of an optical interconnect according to an exemplary embodiment of the present invention.

FIG. 3 shows an optical interconnect 300 according to another illustrative embodiment of the present invention. The optical interconnect 300 illustratively includes a substrate 301 and a lid 302 disposed thereover. The substrate 301 and lid 302 collectively form a waveguide holder. The optical interconnect 300 is similar to the optical interconnect 100 of the illustrative embodiment of FIG. 1. To this end, the optical interconnect 300 has an opening 303 and first and second depressions 304 and 305, respectively. A first guide pin 306 is disposed in first depression 304 and a second guide pin 307 is dispose in second depression 305. The first and second depressions 304 and 305 and openings 303 are features which are formed by substantially the same techniques described in connection with the illustrative embodiment of FIG. 1. The optical interconnect 300 of the illustrative embodiment of FIG. 3, includes alignment recesses 308 formed in the lid 302 and alignment recesses 309 formed in the substrate 301.

Alignment recesses 308 and 309 are illustratively v-shaped notches or grooves formed in the lid 302 and substrate 301. These shapes are merely exemplary, and the alignment recesses 308 and 309 may be inverted pyramidal, inverted trapezoidal or other shapes formed by known etching techniques. When the lid 302 is disposed over the substrate 301 as shown, the alignment recesses 308 and 309 form alignment features 313. As can be readily appreciate, the alignment features 313 are cavities which may have a variety of shapes depending on the shape of the alignment recesses 308 and 309. Alignment features 313 illustratively have positioning members 311, such as a spherical or cylindrical element disposed therein. These positioning members are illustratively microspheres, rod elements or optical fiber sections. The positioning members 311 disposed in the alignment features 313 formed act as alignment fiducials which are accurately located. These alignment fiducials are used to accurately and passively locate the lid 302 over the substrate 301. The alignment fiducials are particularly effective in assuring the accurate location of the waveguides 312 relative to first and second guide pins 306 and 307, respectively.

Figure 4:
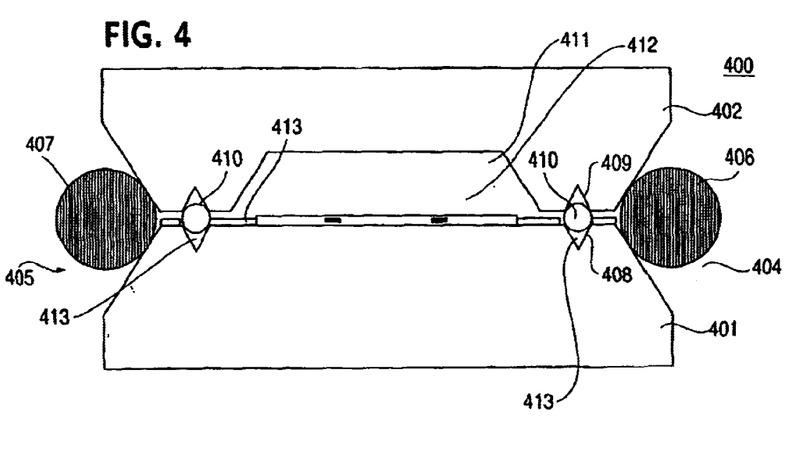
FIG. 4 is a front view of an optical interconnect according to an exemplary embodiment of the present invention.

FIG. 4 shows an optical interconnect 400 according to another illustrative embodiment of the present invention. The optical interconnect 400 is substantially the same as the optical interconnect 300 shown in FIG. 3. To this end, a substrate 401 has a lid 402 disposed thereover, which collectively forms a waveguide holder. First and second depressions 404 and 405 receive first and second guide pins 406 and 407, respectively. Again, similar to the optical interconnect shown in the illustrative embodiment of FIG. 3, alignment recesses 408 and 409 are disposed in the substrate 401 and lid 402, respectively. Positioning members 410 are disposed in the alignment features 413 formed by alignment recesses 408 and 409. Illustratively, alignment features 413 are accurately located and oriented by standard anisotropic etching techniques. As such, the positioning members 410 are useful in accurately locating the lid 402 over the substrate 401. The opening 411 which receives the waveguides 412 therein is also accurately defined and oriented by anisotropic etching techniques. As can be appreciated, the waveguide structure 412 is significantly thinner than that of the illustratively embodiments previously described. Moreover, a residual cladding layer mask 414 remains disposed over the surface of the substrate as shown. The residual cladding layer 414 may be useful in accurately aligning the lid 402 over the substrate 401.

Figure 5:
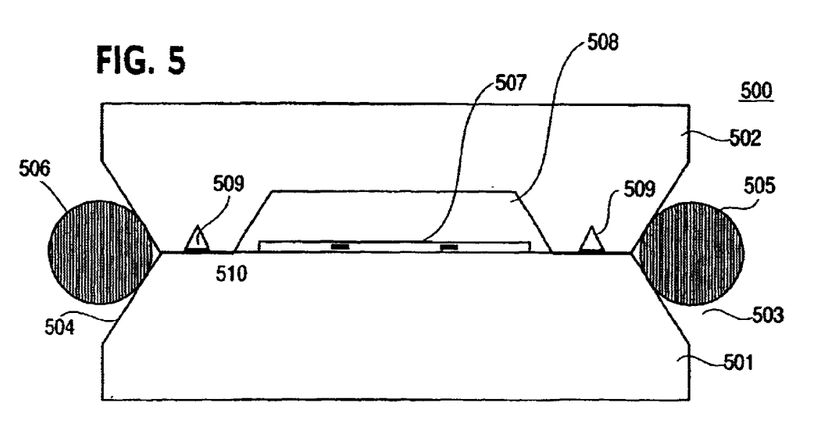
FIG. 5 is a front view of an optical interconnect according to an exemplary embodiment of the present invention.

FIG. 5 shows an optical interconnect 500 according to another illustrative embodiment of the present invention. The optical interconnect 500 of the illustrative embodiment shown in FIG. 5 has a substrate 501 and a lid 502, which collectively form a waveguide holder. Similar to illustrative embodiments described above, first and second depressions 503 and 504, respectively, have first and second guide pins 505 and 506, respectively, disposed therein. Moreover, a waveguide structure 507 is disposed on a top surface of the substrate 501. The lid 502 has an opening 508 formed therein. Alignment recesses 509 are formed in the lid 502. Alignment recesses 509 may be formed by conventional etching techniques, to include wet etching techniques as well as dry etching techniques. These techniques include, but are not limited to anisotropic wet chemical etching as well as dry chemical etching techniques such as reactive ion etching (RIE). These techniques are well known in the art and further details are omitted in the interest of clarity of discussion. The alignment recesses 509 in the lid 502 may receive an alignment pedestal 510.

The alignment pedestals 510 are illustratively formed on the top surface of the substrate 501. The alignment pedestal 510 may in fact be a pedestal formed directly from the substrate 501, or may be an etched feature such as an etched portion of the cladding material used in the fabrication of the waveguide structure 507. The alignment pedestal 510 cooperatively engages the alignment recess 509 and enables the passive alignment of the lid 502 to the substrate 501. This fosters the accurate location and orientation of recesses 503 and 504, and thus, the accurate location and orientation of the first and second guide pins 505 and 506. As described previously, the accurate alignment of the first and second guide pins 505 and 506 enables accurate alignment of the waveguide structure 507 of the optical interconnect 500 to other optical waveguides such as optical fibers in an optical fiber array or an integrated optical chip.

Figure 6:
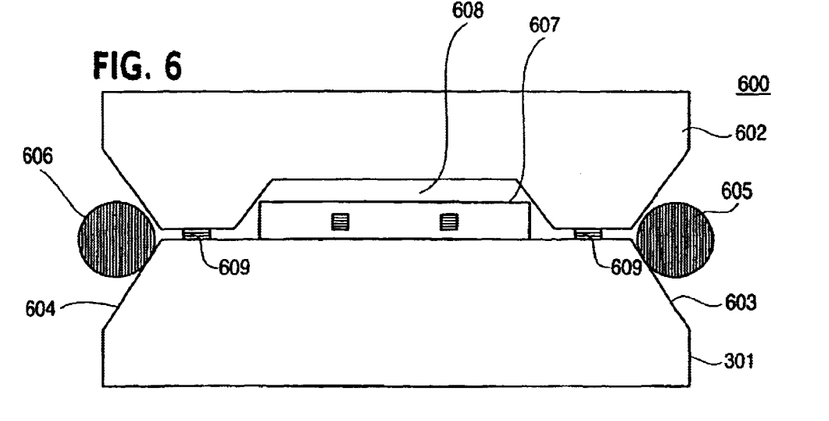
FIG. 6 is a front view of an optical interconnect according to an exemplary embodiment of the present invention.

FIG. 6 shows an optical interconnect 600 according to another illustrative embodiment of the present invention. Similar to the structures described above, the optical interconnect 600 includes a substrate 601 having a lid 602 disposed thereover. The substrate 601 and lid 602 collectively form a waveguide holder. First and second depressions 603 and 604, respectively, receive first and second guide pins 605 and 606, respectively. An optical waveguide structure 607 is disposed in an opening 608 in the lid 602. The lid 602 may be disposed over metal pads 609. These metal pads 609 may be raised metal features disposed over the silicon substrate. The metal pads 609 may be re-flow soldered by well-known techniques. This solder re-flow effects the bonding and, optionally, the alignment of the lid 602 to the substrate 601. As described previously above, first and second guide pins 605 and 606, respectively, are used to accurately align the waveguide structure 607 to other waveguides such as an optical fiber array or other waveguides previously described.

Figure 7:
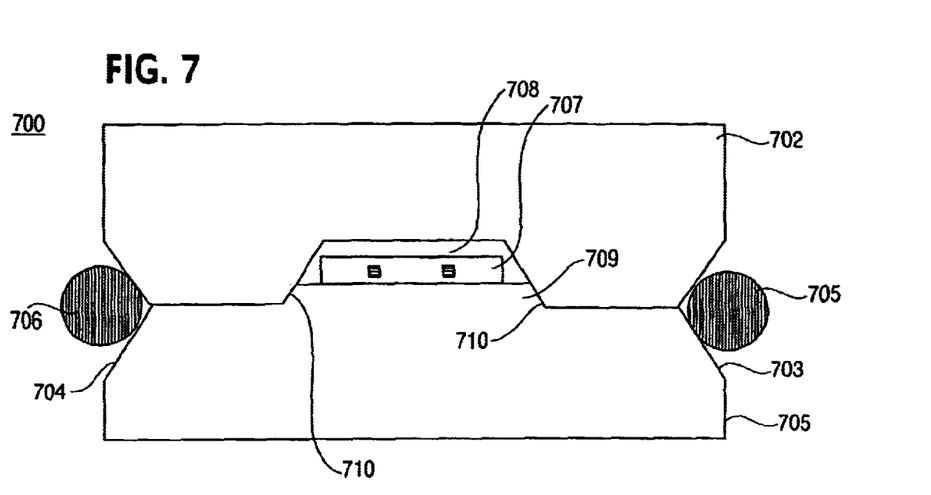
FIG. 7 is a front view of an optical interconnect according to an exemplary embodiment of the present invention.

FIG. 7 shows an optical interconnect 700 according to yet another illustrative embodiment of the present invention. The optical interconnect 700 includes a substrate 701 having a lid 702 disposed thereover, which collectively forms a waveguide holder. First and second depressions 703 and 704, respectively, receive first and second guide pins 705 and 706, respectively. Again, alignment of an optical waveguide structure 707 to other optical waveguides such as an optical fiber array is facilitated by the accurately located first and second guide pins 705 and 706, respectively. An opening 708 is formed in the lid 702 for reception of an optical waveguide structure 707. The substrate 701 has pedestal 709 over which wavguide structure 707 may be disposed. The pedestal 709 may be fabricated by standard etching techniques. Moreover, a complementary overhang 710 is formed in the lid 702 during fabrication of the opening 708. This complementary overhang 710 is adapted to cooperatively engage the pyramid 709 for accurate alignment of the lid 702 to the substrate 701. This cooperative engagement of the overhang 710 and pyramid 709 forms the first and second depressions 703 and 704, respectively, accurately in both location and orientation. Thereby, first guide pin 705 and second guide pin 706 are accurately located and orientated, facilitating accurate optical interconnection schemes described more fully above.

Figure 8:
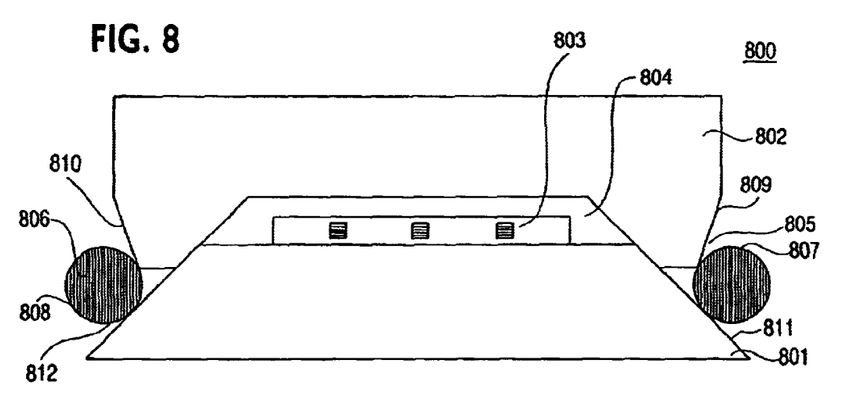
FIG. 8 is a front view of an optical interconnect according to an exemplary embodiment of the present invention.

FIG. 8 shows an optical interconnect 800, according to yet another illustrative embodiment of the present invention, having a substrate 801 and a lid 802 disposed thereover. The substrate 801 and lid 802 comprise a waveguide holder. A waveguide structure 803 is disposed in an opening 804 formed in the lid 802. First and second depressions 805 and 806, respectively, receive first and second guide pins 807 and 808, respectively. The first and second guide pins 807 and 808 usefully enable accurate alignment of the waveguide structure 803 to other waveguides as described in further detail above. As can be readily appreciated, the substrate 801 has been etched by standard etching techniques into a shape which is complementary to the shape of the opening 804. For purposes of illustration, the etching of the opening 804 and that of the substrate 801 may be done by standard anisotropic wet chemical etching. Protrusions 809 and 810 in the lid 802 cooperatively engage side surfaces 811 and 812 of the substrate 801, respectively. This cooperative engagement results in the accurate location and orientation of first and second depressions 805 and 806, respectively; this in turn achieves the accurate location and orientation of guide pins 807 and 808.

Figure 9:
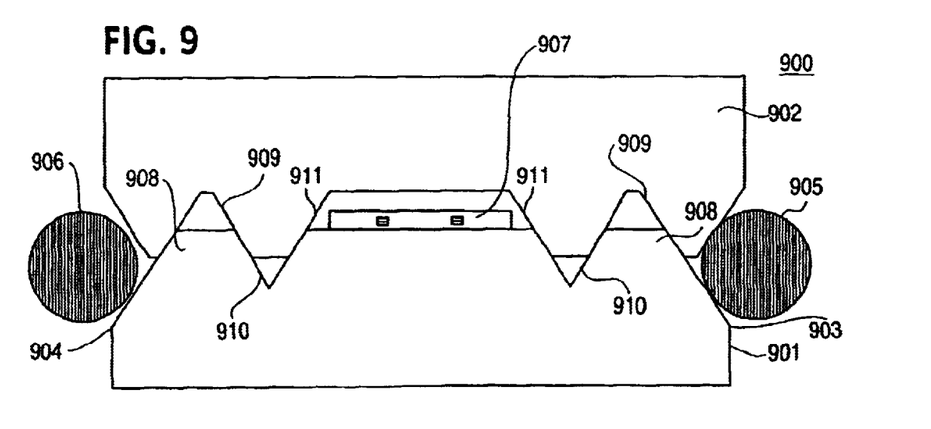
FIG. 9 is a front view of an optical interconnect according to an exemplary embodiment of the present invention.

FIG. 9 shows an optical interconnect 900 according to yet another illustrative embodiment of the present invention. The optical interconnect 900 includes a substrate 901 having a lid 902 disposed thereover, which collectively form a waveguide holder. First and second depressions 903 and 904, respectively, receive first and second guide pins 905 and 906, respectively, in a manner described previously. Again, the accurate location and orientation of the first and second guide pins 905 and 906 by virtue of the accurate location and orientation of first and second depressions 903 and 904 enables the accurate alignment of waveguide structure 907 to other waveguides, such as an optical fiber array or other waveguides described previously. According to the illustrative embodiment of FIG. 9, complementary alignment features are formed in the substrate 901 and the lid 902. Illustratively, pedestals 908 are formed in the substrate 901. Alignment recesses 909 formed in the lid 902 have shape and dimension to receive the pedestals 908 in a complementary fashion. Similarly, alignment recesses 910 are illustratively formed in the substrate 901 to receive pedestals 911 formed in the lid 902. The alignment recesses 909, 910 and pedestals 908, 911 may be of a variety of complementary shapes which result from well-known etching techniques. These are illustratively grooves with complementary pedestals. They may take on a variety of other shapes such as pyramidal pedestals and pyramids.

The complementary alignment features of the substrate 901 and lid 902 of the optical interconnect 900 of FIG. 9, enables the accurate location and orientation of first and second depressions 903 and 904 which ultimately result in the accurate alignment of the waveguide structure 907 to other optical waveguides described previously.

In the illustrative embodiments of the present invention described above, the lids and substrates can be batch-manufactured from wafers of material. The devices of the present invention can be batch-manufactured by bonding a lid wafer (comprising many lid chips) and a substrate wafer (comprising many substrate chips). In this way, alignment between lid and substrate can be provided for many devices simultaneously. Once the wafers are bonded, they can be cut into individual devices with a dicing saw, for example. Materials used for the lid and substrate can be silicon, glass, ceramics or the like. Bonding can be provided by wafer-wafer bonding. For example, borosilicate glass can be sputtered on the lid or substrate wafer (or both) and then the wafers can be heated and pressed together until bonding occurs. Preferably, the lid and substrate have similar coefficients of thermal expansion (e.g., equal to within about $5 \times 10^{-6}$/degree Celsius).

Wafer-level assembly of the present devices is particularly useful in the embodiment shown in FIG. 8. In the device of FIG. 8, the lid can be difficult to locate on the substrate because it can tilt slightly (in a left-right direction). This problem is avoided by assembling (i.e. aligning and bonding) the lid and substrate while they are in wafer form. At the wafer-level, the lid and substrate cannot tilt.

The invention having been described in detail in connection through a discussion of exemplary embodiments, it is clear that various modifications of the invention will be apparent to one having ordinary skill in the art having had the benefit of the present disclosure. Such modifications and variations are included within the scope of the appended claims.

We claim:

1. An optical interconnect, comprising:
   a waveguide holder comprising a first exterior side and a second exterior side, said first exterior side comprising a first depression and said second exterior side comprising a second depression, and said waveguide holder having an opening therein; and
   a planar waveguide structure disposed in said opening.

2. An optical interconnect as recited in claim 1, wherein said waveguide holder comprises a substrate having a lid disposed thereover.

3. An optical interconnect as recited in claim 2, wherein said planar waveguide structure comprises a plurality of waveguides.

4. An optical interconnect as recited in claim 1, wherein said planar waveguide structure forms part of an integrated optical chip.

5. An optical interconnect as recited in claim 2, wherein said substrate comprises a first side with a first edge and said lid comprises a first side with a first edge and said first edges of said lid and said substrate form said first depression.

6. An optical interconnect as recited in claim 5, wherein said substrate comprises a second side with a second edge and said lid comprises a second side with a second edge and said second edges of said lid and said substrate form said second depression.

7. An optical interconnect as recited in claim 2, wherein said lid comprises at least one alignment recess and a positioning member is disposed in each of said at least one alignment recesses.

8. An optical interconnect as recited in claim 2, wherein said lid comprises at least one alignment recess and said substrate comprises at least one alignment recess, and each of said at least one recesses of said lid is disposed over one of said at least one alignment recesses in said substrate forming an alignment feature; and
   a positioning member disposed in each of said alignment cavities.

9. An optical interconnect as recited in claim 2, wherein said substrate and said lid each comprises at least one complementary alignment feature.

10. An optical interconnect as recited in claim 9, wherein said at least one complementary feature further comprises a pedestal disposed in an alignment recess.

11. An optical interconnect, comprising:
    a substrate comprising a first exterior side with a first edge and a second exterior side with a second edge;
    a planar waveguide structure disposed over said substrate; and
    a lid disposed on said planar waveguide structure, wherein a first depression is formed between said first exterior side and said lid and a second depression is formed between said second exterior side and said lid.

12. An optical interconnect as recited in claim 11, wherein said lid comprises a first side with a first overhang and a second side with a second overhang, and said first overhang and said first edge form a said first depression and said second overhang and said second edge form a said second depression.

13. An optical interconnect as recited in claim 1, further comprising a first guide pin in said first depression and a second guide pin in said second depression.

14. An optical interconnect as recited in claim 1, wherein the first and second depressions are on opposite sides of the substrate.

15. An optical interconnect as recited in claim 2, wherein the lid is spaced apart from the planar waveguide structure.

16. Art optical connector, comprising the optical interconnect of claim 1.

17. The optical connector of claim 16, wherein the optical connector is an MT connector, a mini-MT connector, or a MAC connector.

18. An optical interconnect as recited in claim 11, further comprising a first guide pin in said first depression and a second guide pin in said second depression.

19. An optical interconnect as recited in claim 11, wherein the first and second depressions are on opposite sides of the substrate.

20. An optical interconnect, comprising:
- a waveguide holder comprising a substrate and a lid disposed over the substrate, wherein an external surface of the substrate and lid together form a depression for receiving an alignment pin; and
- a planar wavguide structure disposed on the substrate and under the lid.

* * * * *